United States Patent
Suzuki

(10) Patent No.: US 7,469,583 B2
(45) Date of Patent: Dec. 30, 2008

(54) FLOW SENSOR

(75) Inventor: Isao Suzuki, Tokyo (JP)

(73) Assignee: MKS Japan, Inc., Tokyo (JP)

( * ) Notice: Subject to any disclaimer, the term of this patent is extended or adjusted under 35 U.S.C. 154(b) by 14 days.

(21) Appl. No.: 11/708,315

(22) Filed: Feb. 21, 2007

(65) Prior Publication Data
US 2008/0196494 A1    Aug. 21, 2008

(51) Int. Cl.
G01F 1/68    (2006.01)
(52) U.S. Cl. .................. 73/204.25; 73/204.26
(58) Field of Classification Search .. 73/204.23–204.27
See application file for complete search history.

(56) References Cited

U.S. PATENT DOCUMENTS

| | | | |
|---|---|---|---|
| 3,938,384 A | | 2/1976 | Blair |
| 4,517,838 A | | 5/1985 | Wachi et al. |
| 4,519,246 A | * | 5/1985 | Hartemink ............ 73/202.5 |
| 4,815,280 A | | 3/1989 | Tujimura et al. |
| 5,191,793 A | * | 3/1993 | Drexel et al. ........... 73/204.22 |
| 5,792,952 A | * | 8/1998 | Ritchart ................. 73/204.27 |
| 6,318,171 B1 | * | 11/2001 | Suzuki .................. 73/204.27 |
| 6,477,901 B1 | * | 11/2002 | Tadigadapa et al. ..... 73/861.352 |
| 6,637,264 B2 | * | 10/2003 | Lotters et al. ........... 73/204.27 |
| 6,647,778 B2 | * | 11/2003 | Sparks .................. 73/204.26 |
| 6,883,370 B2 | * | 4/2005 | Vincze et al. .......... 73/204.26 |
| 7,021,136 B2 | * | 4/2006 | Vincze et al. .......... 73/204.26 |

* cited by examiner

*Primary Examiner*—Edward Lefkowitz
*Assistant Examiner*—Jonathan Dunlap
(74) *Attorney, Agent, or Firm*—Wenderoth, Lind & Ponack, L.L.P.

(57) ABSTRACT

A flow sensor readily obtains high sensitivity without errors due to tilting. The flow sensor includes a flow channel having a pair of parallel portions and temperature sensing resistors for heating a fluid to a preset temperature. The temperature sensing resistors are disposed on parts of the parallel portions of the flow channel, to detect a fluid flow rate based on a change in temperature distribution of a flow channel due to a change in flow rate of the fluid flowing through the flow channel. The temperature sensing resistors include a first upstream temperature sensing resistor and a first downstream temperature sensing resistor that are disposed in a line on upstream and downstream sides of one of the parallel portions, respectively; and a second upstream temperature sensing resistor and a second downstream temperature sensing resistor that are disposed in a line on upstream and downstream sides of the other parallel portion, respectively.

5 Claims, 4 Drawing Sheets

HORIZONTAL

VERTICAL

FLOW SENSOR

BACKGROUND OF THE INVENTION

1. Technical Field

The present invention relates to a flow sensor, and in particular, to a reduction in errors of and an improvement in sensitivity of a flow sensor for a thermal mass flowmeter that is adapted to detect a mass flow rate based on a change in temperature distribution of a narrow tube through which a fluid is passed while the tube is being heated.

2. Related Art

Generally, heating of and measurement of temperature of a narrow tube of a flow sensor for a thermal mass flowmeter is performed by applying an electric current through temperature sensing resistors provided on the narrow tube.

A conventional flow sensor for a fluid flowmeter is disclosed, for example, in U.S. Pat. No. 3,938,384, wherein a sensor is provided for detecting a flow rate of a fluid flowing through a heated narrow tube, a thermally insulating material being used in the sensor so as to prevent convection at an outer space of the narrow tube. When the sensor is positioned at a different angle, the outer convection generates a temperature gradient on the heated narrow tube, which causes a flow sensing error. This error is called an attitude error. As the thermally insulating material, a material such as glass wool is generally now used. However, such a material has some disadvantages; for example, an amount of the material to be used cannot be easily controlled when manufacturing and properties of the material change under the influence of humidity (see U.S. Pat. No. 3,938,384).

U.S. Pat. No. 4,517,838 also discloses a structure having: a spacer between a pair of wound coils functioning as temperature sensing resistors; and a narrow groove surrounding an outer space of a narrow tube. This structure is designed to reduce air convection generated outside the narrow tube when a sensor is positioned at a different angle and the attitude errors associated with the convection. However, the spacer is located at a position on the narrow tube where the temperature reaches the highest. Accordingly, there is a disadvantage that heat loss due to heat dissipation from this position arises. Another disadvantage is that the narrow groove absorbs heat, causing a reduction in sensitivity (see U.S. Pat. No. 4,517,838).

In U.S. Pat. No. 4,815,280, multilayered coils are used as temperature sensing resistors. Such a multilayered structure is designed to reduce a coil width and a response time. However, this structure is also subject to a problem in that it is difficult to obtain a sensor having high sensitivity, because of heat transmission in an outer circumferential portion of the coil. Further, a number of problems exist in manufacturing, in particular, it is extremely difficult to produce a very fine, uniform multilayered coil (see U.S. Pat. No. 4,815,280).

SUMMARY OF THE INVENTION

An object of the present invention is to provide a flow sensor that overcomes the above-mentioned disadvantages of conventional sensors, that is capable of readily achieving a high sensitivity, and that does not generate attitude error when the sensor is positioned at different angles.

To achieve this object, the flow sensor of the present invention includes: a flow channel having a pair of parallel portions; and temperature sensing resistors for heating a fluid to a preset temperature, the temperature sensing resistors being disposed on parts of the parallel portions of the flow channel, so as to detect a fluid flow rate based on a change in temperature distribution of a flow channel due to a change in flow rate of the fluid flowing through the flow channel. The flow sensor comprises a first upstream temperature sensing resistor and a first downstream temperature sensing resistor that are disposed in a line at an inlet side of one of the parallel portions, and a second upstream temperature sensing resistor and a second downstream temperature sensing resistor that are disposed in a line at downstream sides of the other parallel portion, respectively.

The first upstream temperature sensing resistor and the second upstream temperature sensing resistor are electrically connected to constitute a pair of upstream temperature sensing resistors, while the first downstream temperature sensing resistor and the second downstream temperature sensing resistor are electrically connected to constitute a pair of downstream temperature sensing resistors.

An outer space of the first upstream temperature sensing resistor and the first downstream temperature sensing resistor, and an outer space of the second upstream temperature sensing resistor and the second downstream temperature sensing resistor are isolated so that an air flow does not happen between each of the spaces.

A narrow tube serving as a flow channel is bent such that a portion of the narrow tube having the first upstream and downstream temperature sensing resistors and a portion of the narrow tube having the second upstream and downstream temperature sensing resistors are disposed in parallel relation to each other.

A flow rate of a fluid is detected from a change in resistance of the pair of upstream temperature sensing resistors and the pair of downstream temperature sensing resistors structured in the above-described manner.

The structure of the present invention prevents any error which may otherwise occur due to air convection generated outside the flow channel. When, for example, the flow sensor of the present invention is disposed horizontally, the temperature of the temperature sensing resistors located at a higher place becomes higher than that of those located at a lower place due to convection generated outside the flow channel. However, since rates of change in temperature-measurement resistance due to the convection on the left and right sides are equal to each other, the combined resistance of each pair of temperature sensing resistors that are disposed in diagonal relation to each other becomes the same; therefore, an output remains unaffected.

On the other hand, when the flow sensor of the present invention is disposed in a vertical direction, portions of the flow channel where the temperature sensing resistors are located are oriented in a horizontal direction. Therefore, convection is not generated outside the flow channel. Normally, when a conventional sensor is under this condition, an upward convection is generated in the flow channel, causing an error. However, since the upper and lower ends of the flow channel of the present invention are heated to the same temperature, convection is not generated in the flow channel even when the flow sensor of the present invention is disposed in the vertical direction. As a result, the flow sensor of the present invention is free of any error that may otherwise arise due to convection inside and outside the flow channel, regardless of a direction in which the flow sensor is positioned.

Further, a very high sensitivity in flow rate detection can be obtained as the sensitivity is determined by a combined value of the first and second temperature sensing resistors.

DETAILED DESCRIPTION OF THE INVENTION

Figure 1:
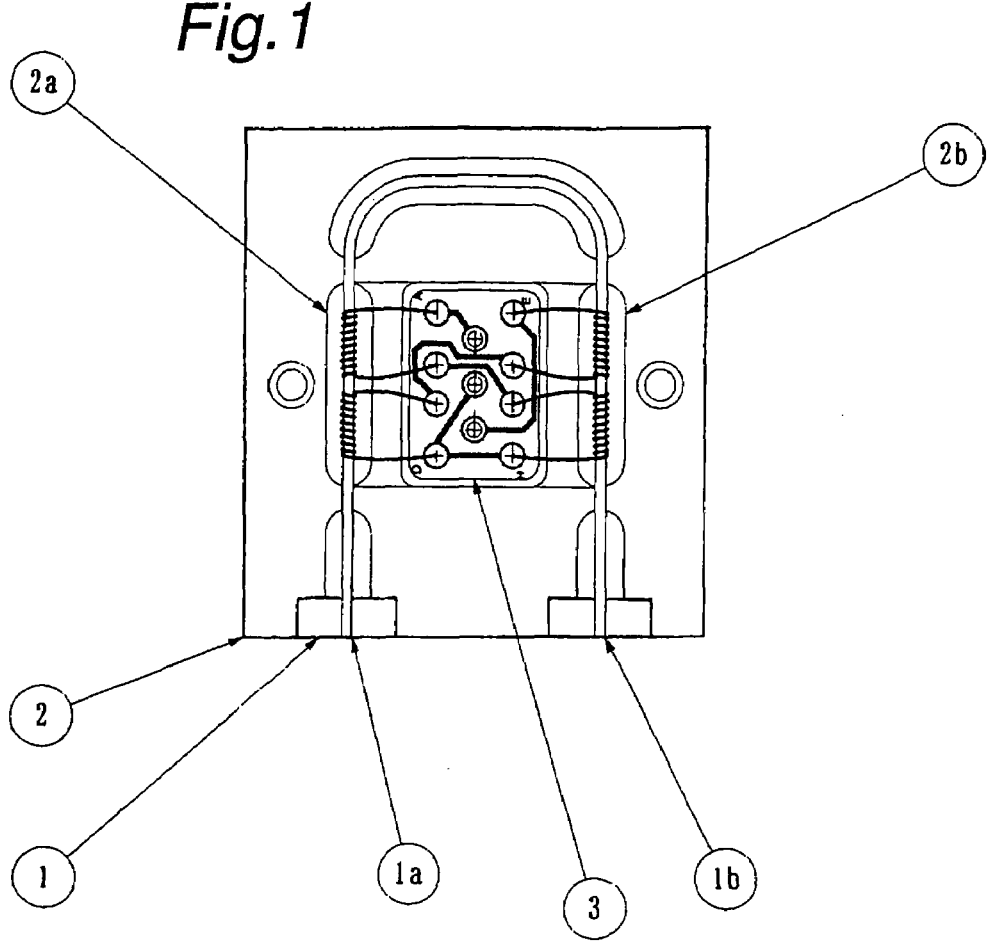
FIG. 1 is a schematic structural view of a flow sensor of the present invention.
Figure 2:
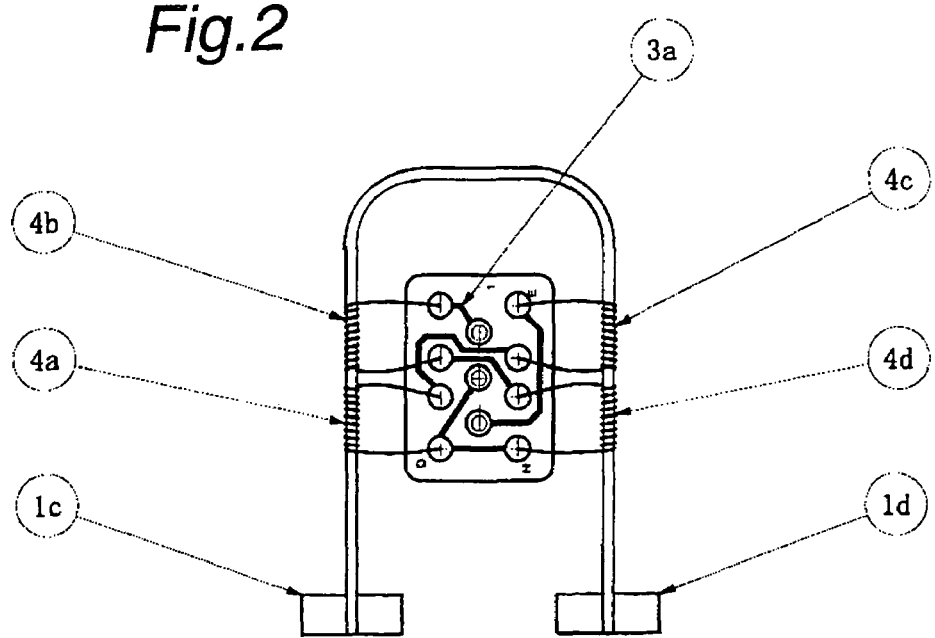
FIG. 2 is a front view of the detailed structure of a sensor portion of the flow sensor of the present invention.

FIG. 1 is a schematic structural view of the flow sensor of the present invention. Reference numeral 1 denotes a U-shaped metal tube having opposite ends thereof connected to flanges 1c and 1d, such that a fluid flows in through an inlet 1a and flows out through an outlet 1b. As shown in FIG. 2 in greater detail, the metal tube 1 has a first upstream temperature sensing resistor 4a and a first downstream temperature sensing resistor 4b that are wound around the metal tube 1, the first upstream temperature sensing resistor 4a and the first downstream temperature sensing resistor 4b being disposed in a line on a fluid inlet side of the metal tube 1. Similarly, the metal tube 1 also has a second upstream temperature sensing resistor 4c and a second downstream temperature sensing resistor 4d wound around the metal tube 1, the second upstream temperature sensing resistor 4c and the second downstream temperature sensing resistor 4d being disposed in a line on a fluid outlet side of the metal tube 1. The temperature sensing resistors are made of an insulated Ni-alloy resistance wire for temperature measurement and are wound around the metal tube. The resistance of the temperature sensing resistors varies with temperature.

The metal tube 1 and the temperature sensing resistors 4a to 4d are embedded in a metal case 2. The metal case 2 is provided with spaces 2a and 2b, the space 2a enclosing the first upstream temperature sensing resistor 4a and the first downstream temperature sensing resistor 4b, and the space 2b enclosing the second upstream temperature sensing resistor 4c and the second downstream temperature sensing resistor 4d.

Figure 3:
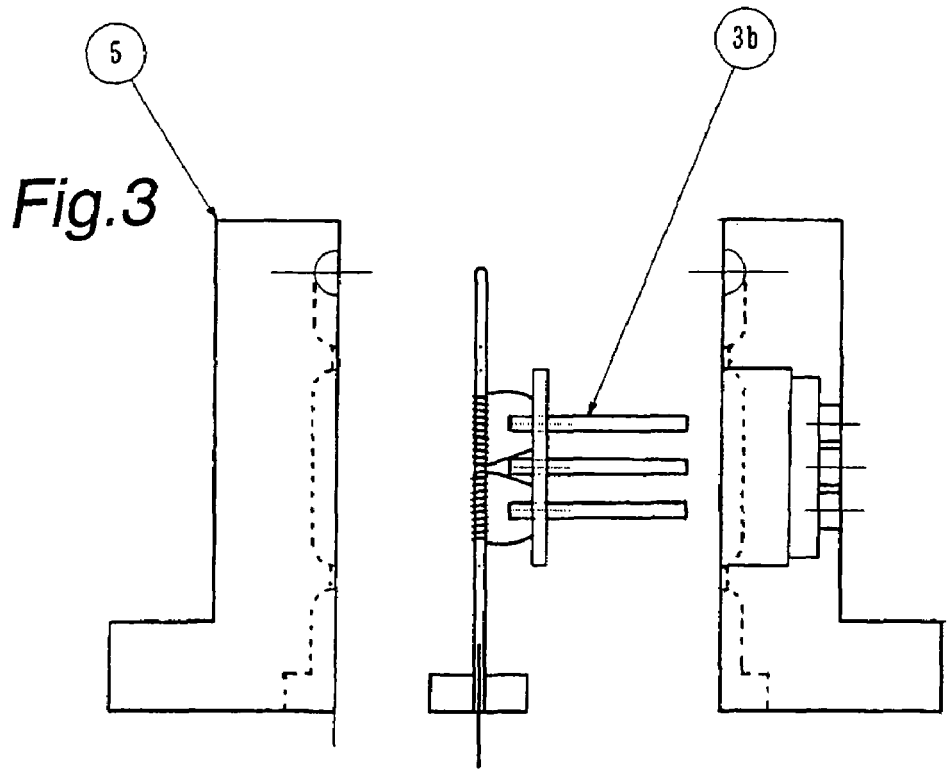
FIG. 3 is an exploded side view of the flow sensor of the present invention.

Each of the above-mentioned temperature sensing resistors is electrically connected to a terminal block 3. As shown in FIG. 2, the terminal block 3 is provided with a circuit 3a where the first upstream temperature sensing resistor 4a and the second upstream temperature sensing resistor 4c are connected in series to form a pair of upstream temperature sensing resistors 4ac, while the first downstream temperature sensing resistor 4b and the second downstream temperature sensing resistor 4d are connected in series to form a pair of downstream temperature sensing resistors 4bd. Further, as shown in FIG. 3, the terminal block 3 is provided with a terminal 3b for electrically connecting the temperature sensing resistors 4ac and 4db to an external device. The metal tube 1 embedded in the metal case 2 is tightly closed by a metal case 5 similar to the metal case 2 (see FIG. 3).

The temperature sensing resistors 4ac and 4bd are heated to a preset temperature by externally applying an electric current therethrough. When a fluid is passed through the metal tube in this heated state, the resistances of the temperature sensing resistors vary according to a flow rate of the fluid in accordance with the following equation:

$$R(4bd)-R(4ac)=KQ$$

R(4ac): resistance of the temperature sensing resistors 4ac
R(4bd): resistance of the temperature sensing resistors 4bd
K: proportionality coefficient
Q: mass flow rate of the fluid Based on the changes in these resistances, a fluid flow rate can be calculated to determine an actual fluid flow rate.

Figure 4:
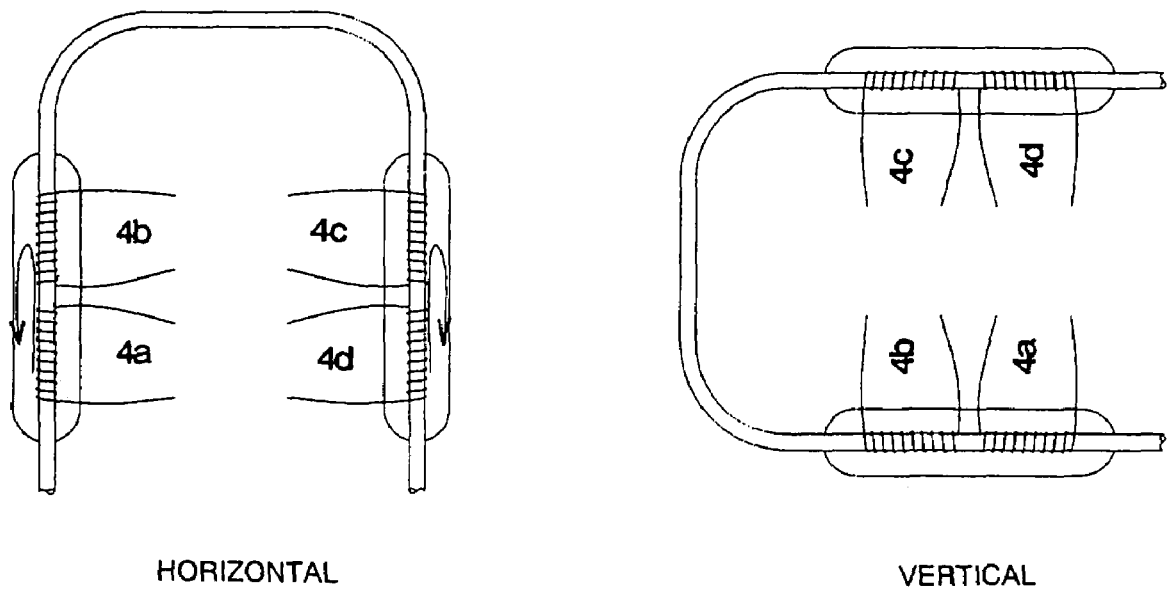
FIG. 4 shows the flow sensor of the present invention as it appears when it is disposed in two directions.

The flow sensor of the present invention has a pair of temperature sensing resistors provided on each side of the U-shaped tube, each temperature sensing resistor on one side of the tube being connected in series to a temperature sensing resistor on the other side of the tube, which is disposed in diagonal relation to the temperature sensing resistor on the one side of the tube, to form a pair of temperature sensing resistors. This prevents any error in measurement due to convection that is generated outside the metal tube. More specifically, when the sensor is disposed in a horizontal direction as shown in the left side of FIG. 4, convection generated outside the metal tube (indicated by an arrow in the left one of FIG. 4) causes the temperature of the temperature sensing resistors located on top of the others to become higher than that of the others; therefore, the relations R(4a)<R(4b) and R(4d)<R(4c) hold (where R(4a) to R(4d) denotes respective resistances of the temperature sensing resistors). However, since rates of change in resistances of the temperature sensing resistors due to the convection are the same on the left and right sides, the relation R(4ac)=R(4bd) holds; therefore, an output remains unaffected. When the sensor is disposed in a vertical direction as shown in a right one of FIG. 4, portions of the metal tube where the temperature sensing resistors are located are oriented in a horizontal direction, and convection is not generated outside the metal tube. Normally, in this state, convection in an upward direction of the metal tube is generated in the metal tube, thus causing an error. However, since upper and lower ends of the tube of the present invention are heated to the same temperature, convection is not generated in the tube even when the sensor is positioned in the vertical direction. Therefore, no matter in what direction the sensor is positioned, the sensor is kept free of errors which may otherwise arise due to convection inside and outside the tube.

Figure 5:
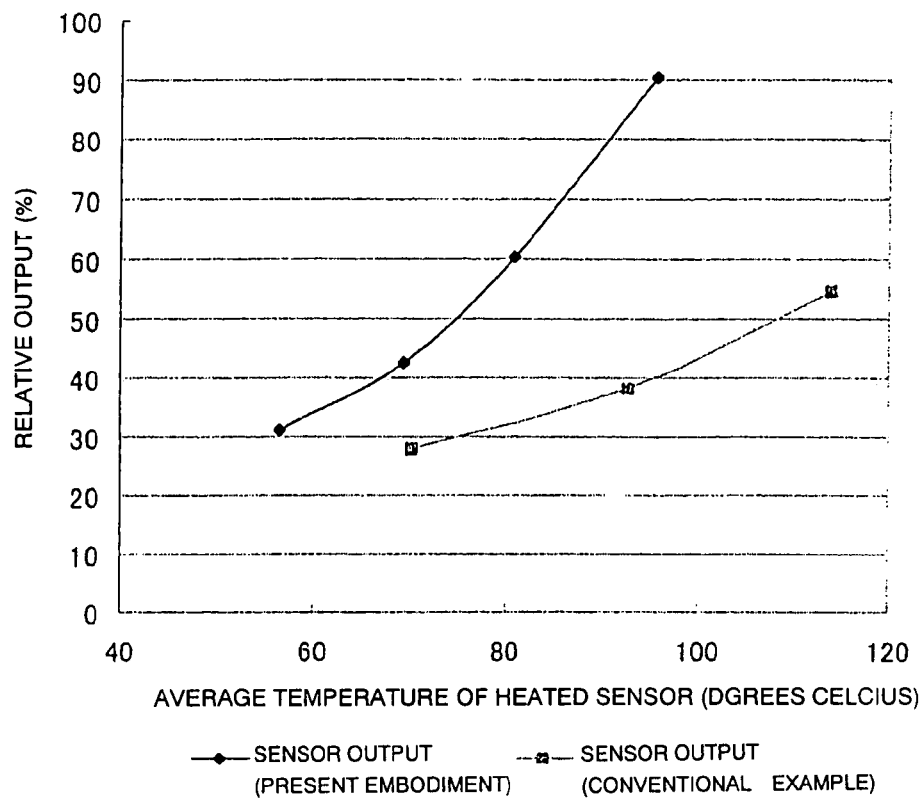
FIG. 5 is a graph of temperature versus output comparing the flow sensor of the present invention and a conventional flow sensor.

Further, a very high sensitivity in flow rate detection can be achieved as the sensitivity is determined by a combined value of the first and second temperature sensing resistors. FIG. 5 is a graph comparing output results of the temperature sensing resistors of the present invention and conventional temperature sensing resistors with respect to heating temperature. As will be apparent from the graph, use of the temperature sensing resistors of the present invention makes a flow sensor highly sensitive with a sensitivity about twice that of a conventional one.

Figure 6:
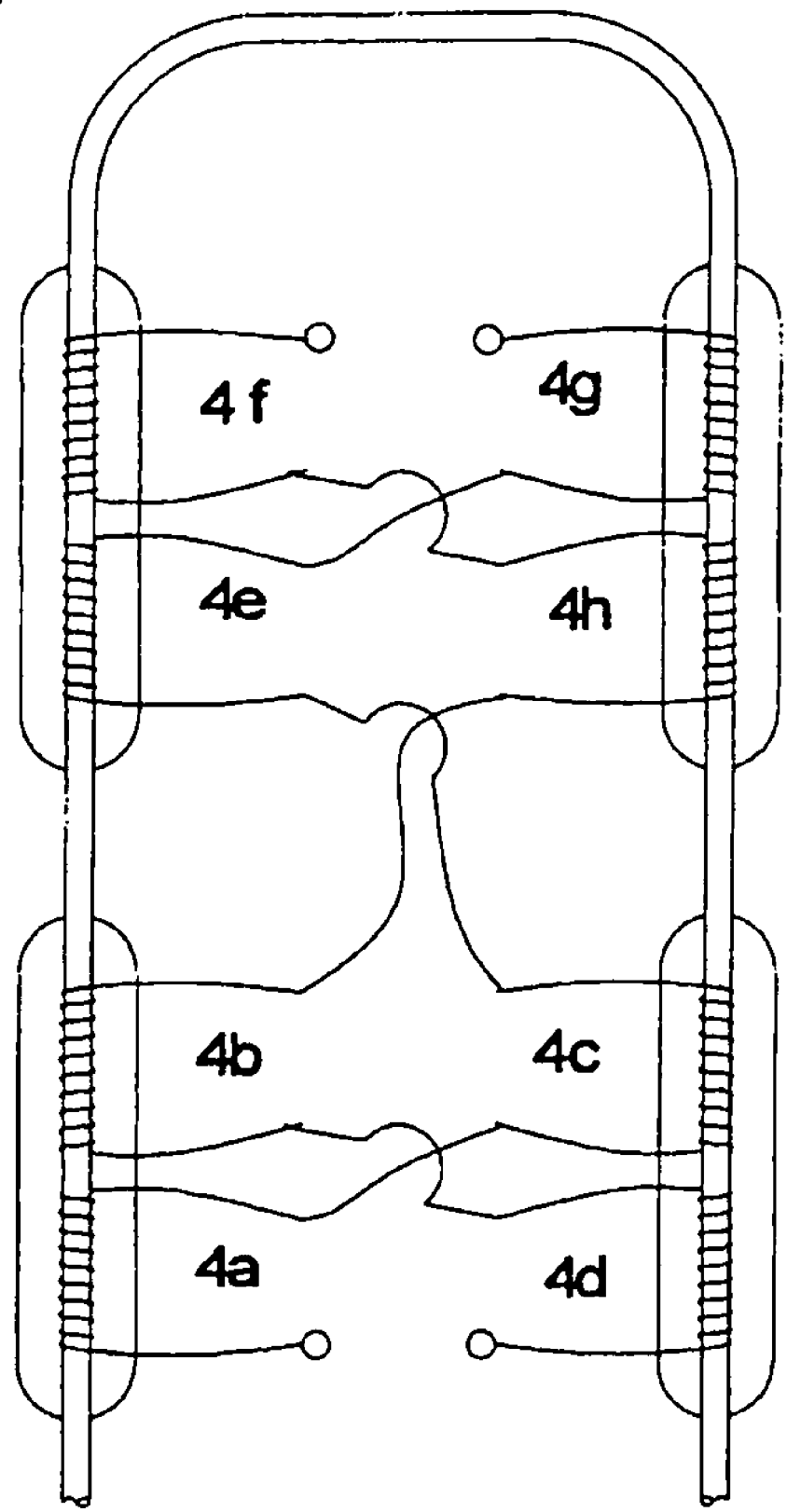
FIG. 6 is a schematic structural view of a sensor portion of a flow sensor according to another embodiment of the present invention.

FIG. 6 shows a flow sensor having additional temperature sensing resistors 4e to 4h on parallel portions of a metal tube. The temperature sensing resistors located in each space on the upstream side are connected in series, and the temperature sensing resistors on the downstream side are also connected in series in a similar manner. This structure can further improve the sensitivity of the sensor.

It is to be noted that the temperature sensing resistors used in the embodiment of FIG. 6 are coated resistance wires wrapped around a tube; however, instead, thin-film temperature sensing resistor elements, which are made of a ceramic substrate formed with a thin film of platinum or the like, can be fixed to portions of a tube, using an adhesive.

Further, it is also to be noted that the flow channel used in the embodiment of FIG. 6 is a metal tube; however, instead, a silicon wafer can be etched to form a groove to which another silicon wafer or the like having a plurality of temperature sensing resistors on a surface thereof is attached to form a flow channel.

What is claimed is:

1. A flow sensor including:
   a flow channel having a pair of parallel portions; and
   a plurality of temperature sensing resistors for heating a fluid flowing through the flow channel to a preset temperature, the temperature sensing resistors being disposed on parts of the parallel portions of the flow channel to detect a fluid flow rate based on a change in temperature distribution of the flow channel due to a change in flow rate of the fluid flowing through the flow channel,
   wherein the plurality of temperature sensing resistors includes:
      a first upstream temperature sensing resistor and a first downstream temperature sensing resistor that are disposed in a line on one of the parallel portions; and
      a second upstream temperature sensing resistor and a second downstream temperature sensing resistor that are disposed in a line on the other parallel portion, and
   wherein the first upstream temperature sensing resistor is upstream of the first downstream temperature sensing resistor in a direction of flow of the fluid in the flow channel, the first downstream temperature sensing resistor is upstream of the second upstream temperature sensing resistor in the direction of flow of the fluid in the flow channel, and the second upstream temperature sensing resistor is upstream of the second downstream temperature sensing resistor in the direction of flow of the fluid in the flow channel wherein the first upstream temperature sensing resistor and the second upstream temperature sensing resistor are electrically connected as a combined upstream temperature sensing resistor, and the first downstream temperature sensing resistor and the second downstream temperature sensing resistor are electrically connected as a combined downstream temperature sensing resistor.

2. A flow sensor according to claim 1, further comprising a case in which the flow channel is formed, wherein
   the flow channel has a tubular shape, and
   the case has a first closed space enclosing the first upstream temperature sensing resistor and the first downstream temperature sensing resistor and a second closed space enclosing the second upstream temperature sensing resistor and the second downstream temperature sensing resistor.

3. A flow sensor according to claim 2, wherein the temperature sensing resistors are insulated metal wires coiled around the tubular flow channel.

4. A flow sensor according to claim 2, wherein the temperature sensing resistors are thin-film temperature sensing resistor elements adhered to outer portions of the tubular flow channel.

5. A flow sensor according to claim 1, wherein the first upstream temperature sensing resistor and the second upstream temperature sensing resistor are electrically connected in series, and the first downstream temperature sensing resistor and the second downstream temperature sensing resistor are electrically connected in series.

* * * * *